United States Patent [19]

Roullet et al.

[11] 4,183,069

[45] Jan. 8, 1980

[54] SUPPORT APPARATUS FOR A FLEXIBLE DISC AND DISC READER USING THIS SUPPORT APPARATUS

[75] Inventors: Gérald Roullet; Jean-Pierre Bortuzzo; Serge Chevalier, all of Paris, France

[73] Assignee: Thomson-Brandt, Paris, France

[21] Appl. No.: 919,547

[22] Filed: Jun. 27, 1978

[30] Foreign Application Priority Data

Jul. 1, 1977 [FR] France ............................. 77 20374

[51] Int. Cl.² ...................... G11B 5/60; G11B 17/32
[52] U.S. Cl. ................................... 360/102; 360/99
[58] Field of Search ........................... 360/99, 102

[56] References Cited

U.S. PATENT DOCUMENTS

| | | | |
|---|---|---|---|
| 2,950,353 | 8/1960 | Fomenko | 360/99 |
| 3,178,719 | 4/1965 | Shapiro | 360/99 |
| 3,767,865 | 10/1973 | Schuller et al. | 360/99 |
| 3,947,886 | 3/1976 | Hiedecker et al. | 360/99 |
| 3,980,810 | 9/1976 | Tinet | 360/102 |

Primary Examiner—Robert S. Tupper
Attorney, Agent, or Firm—Cushman, Darby & Cushman

[57] ABSTRACT

The invention relates to support systems for flexible information-carrying discs. More particularly, the invention relates to an air bearing support plate (1) for a flexible disc (3) of which the sliding surface (2) is free in a preponderant sector from any profile irregularity (6) capable of affecting the flatness of the annular band of the disc (3) containing the information. The invention is applicable in particular to the optical reading by reflection or transmission of information carried by a flexible disc.

15 Claims, 5 Drawing Figures

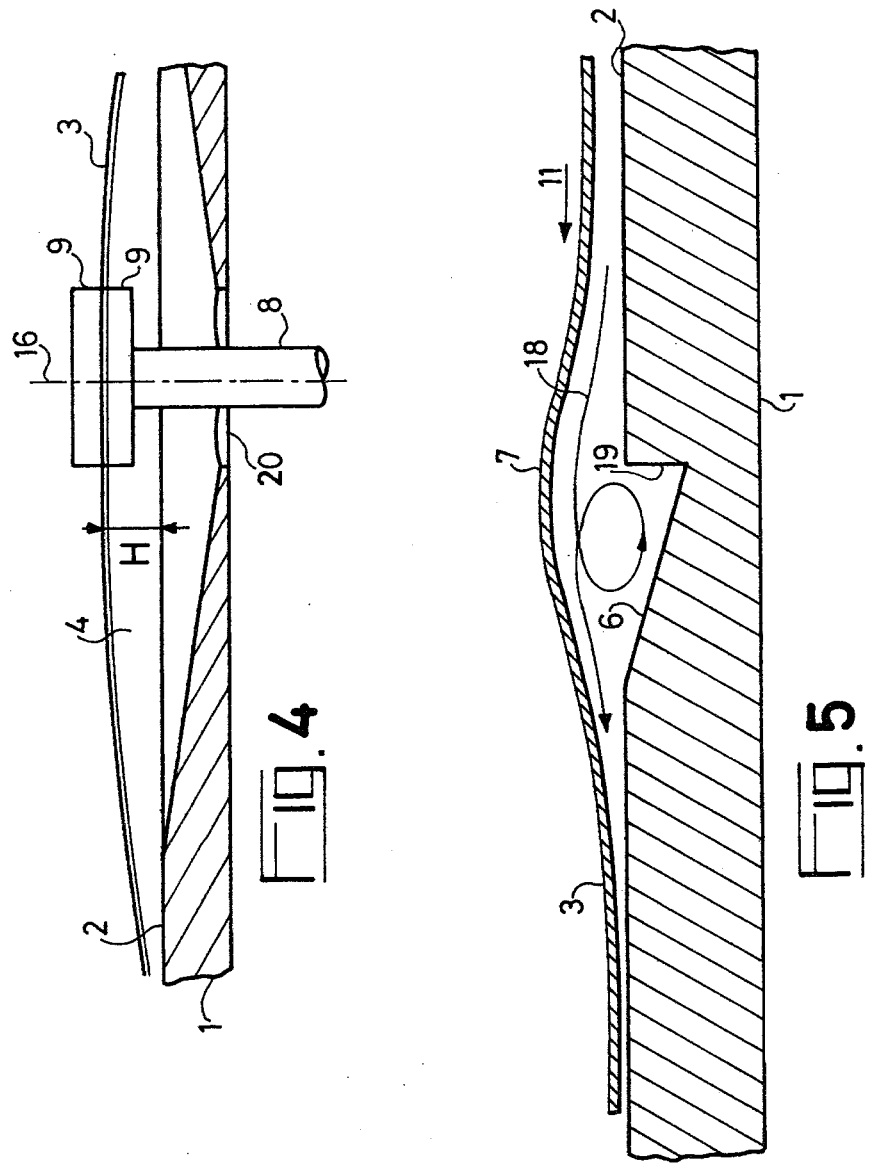

SUPPORT APPARATUS FOR A FLEXIBLE DISC AND DISC READER USING THIS SUPPORT APPARATUS

This invention relates to support systems intended to ensure the accurate positioning of an annular band of a flexible disc fixed at its centre to a rotating spindle. A disc of the type in question resting on a flat surface follows the shape of that surface in the absence of mechanical stressing. However, the mere removal of the disc from the flat surface by taking it by the periphery or by the centre is sufficient for it to assume a curved form. This lack of rigidity is attributable to the thinness of the disc however, by providing a suitable support generated aerodynamically by its rotation in the immediate proximity of a fixed and rigid supporting surface, it is possible to ensure that its annular band assumes a precise position, at least in an exploration zone where it is desired to record or read information. In practice, the support means used is an air cushion of which the mechanical action on the disc is considerable by virtue of its flexibility.

Besides support systems for flexible disc, there are support systems for rigid discs which operate in conjunction with a driven supporting plate. In this case, the flatness of the disc has to satisfy stringent requirements and the use of an air cushion ensures that this strict flatness is not affected by any irregularities in the flatness of the plate.

Experience has shown that, in order to simplify manufacture of the discs and to facilitate their handling, it is best to use those which, being flat in shape in the absence of stresses, can readily be deformed in order locally to assume a stable shape imposed during rotation by a support system. In known support systems for flexible discs, precise positioning is ensured by means of a table provided with a curved sliding surface in the shape of a dihedron or provided with bosses. The disc rotating on a table of this type undergoes significant deformations so that any anisotropy in the elastic properties of the disc adversely affects the accuracy of the required positioning.

It is therefore of advantage to use a sliding surface which is flat. However, to ensure that the support of the disc by an air cushion results in accurate positioning, it has become necessary to provide in the supporting plate air intake orifices or passages subjected to a reduced pressure in order to allow accurate adjustment of the thickness of the air cushion and to enable the abrasive particles capable of scratching the disc or plate to be removed. The presence of air intake orifices or passages throughout the entire annular band reserved for the storage of information represents a disadvantage because they are capable of giving rise to irregularities in flatness of the same order as those to which any anisotropy in the elastic properties of the disc can lead when the disc is forced to undergo deformation.

In accordance with a first object of the present invention, there is provided an air bearing for supporting an information carrier in the form of a flexible disc provided on at least one of its faces with an annular band reserved for the storage of said information and with a hole intended to receive a drive spindle, said air bearing comprising a fixed stabilizing plate having a sliding surface such that said annular band retains its flatness when its supports said dics in its stationary position, an air intake means which, under the effect of the rotation of the disc, ensure that a supporting air cushion is formed between said disc and said stabilizing plate; said sliding surface being locally depressed for improving the floating of said flexible disc and being free from any irregularity capable of adversely affecting the flatness of said annular band in a major sector of said disc.

In accordance with a further object of the present invention, there is provided a disc reader using an air bearing as above mentioned.

For a better understanding of the present invention and to show how the same may be carried into effect reference will be made to the following description in conjunction with the accompanying drawings, wherein:

FIG. 4 is a sectional view showing the central part of the system shown in FIG. 1.

FIG. 5 is a sectional view showing the front part of the system shown in FIG. 1.

The invention is concerned with the supporting of a flexible disc irrespective of the particular methods used for storing and reading the information. The information may be stored by optical, magnetic, electrical or mechanical recording and, depending upon the method adopted for recording, may be read mechanically by means of a stylus, electromagnetically by means of a reading head, capacitively and, of course, optically in accordance with the well known principles of reading by reflection or transmission.

Irrespective of the type of storage and method of reading adopted, provision must be made to ensure that the information carried by the disc can be explored at as constant a level as possible.

Figure 1:
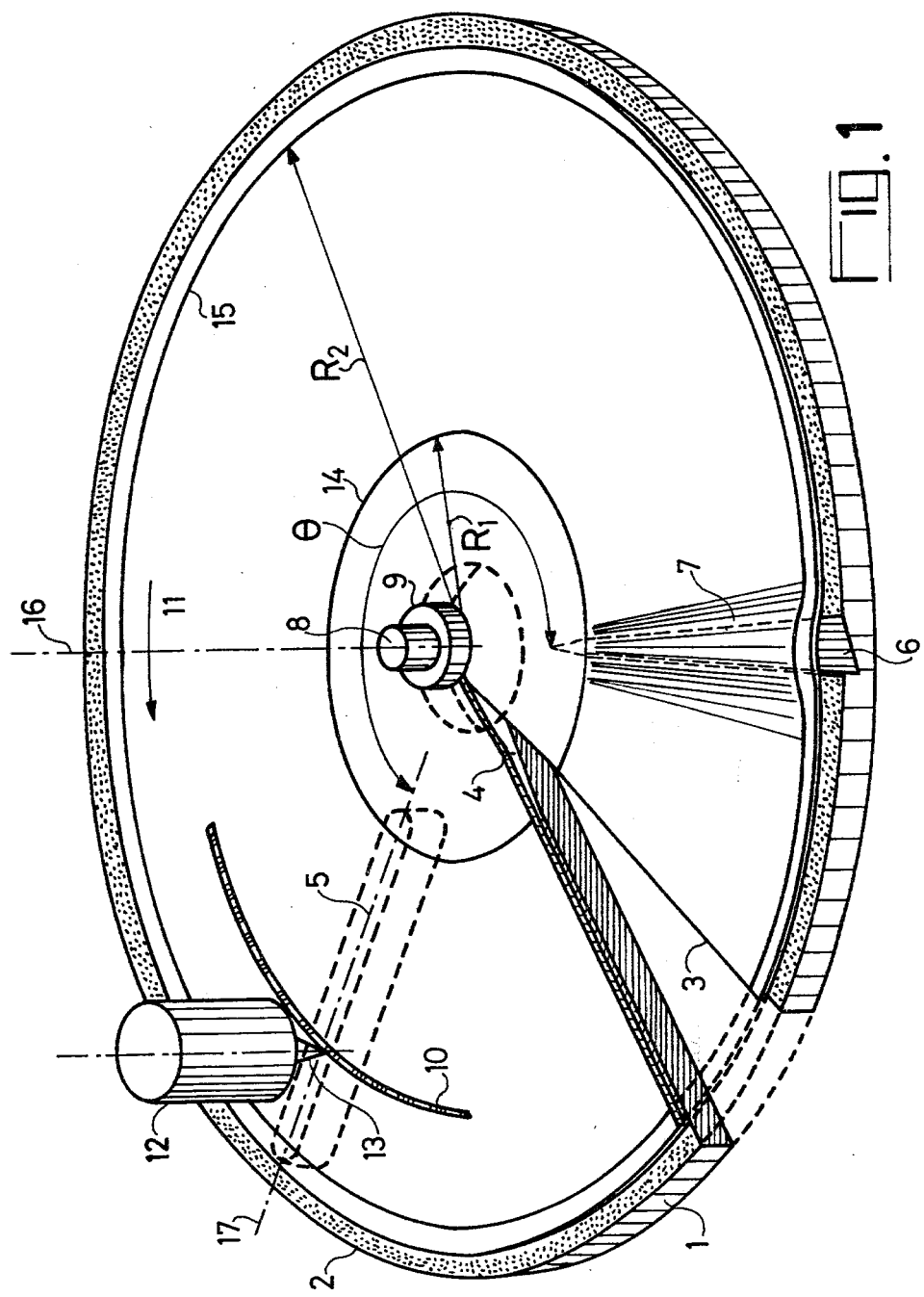
FIG. 1 is a partial isometric view of a reader using an air bearing according to the invention.

FIG. 1 shows a support system for an information carrier 3 in the form of a flexible disc. By way of non-limiting example, the disc 3 is obtained from a sheet of polyvinyl chloride having a thickness of 0.15 mm. The external diameter of the disc is for example 30 cm and it comprises an annular band situated between an inner circumference 14 of radius $R_1$ and an outer circumference 15 of radius $R_2$. The information is accomodated in the annular band, for example in the form of an impression assuming the form of a spiral track 10 consisting of a succession of microgrooves. A disc such as this is readable by transmission or by reflection. A reading head 12 supplies a convergent beam 13 which illuminates the track in quasi-punctiform manner. It is therefore important to provide for precise stabilization of the rotating disc in order to keep the distance between the reading head 12 and the point at which the beam 13 impinges on the track 10 as constant as possible.

To this end, the support system comprises a stabilizing plate 1. This rigid plate is fixed. In the stationary position, the disc 3 rests on a sliding surface 2 of the stabilizing plate 1.

The sliding surface has a profile such that the disc 3 retains in the annular band the flatness by which it is characterised in the absence of any deformation. A rotating spindle 8 rotating about a drive axis 16 in the direction 11 drives the disc 3. To this end, the disc 3 is provided with a central hole in which the spindle 8 engages. A fixing element 9 secures the disc 3 to the spindle 8. The spindle 8 belongs to a drive motor situated above or below the plate 1. In the latter case, it is necessary to provide a central opening in the plate 1 to allow free passage for the spindle 8.

When the spindle 8 is rotated, the air trapped between the disc 3 and the sliding surface 2 of the plate is forced into a gyratory movement and, under the effect of the centrifugal acceleration, is expelled towards the periphery, applying an aerodynamic lifting force to the disc. Thus, the disc 3 moves away from the plate 1 although, to ensure that this separating movement takes place uniformly over the entire disc 3, it is necessary to provide an air intake in the vicinity of the shaft 16. Thus, a permanent air cushion is formed between the disc 3 and the plate 1 so that the disc 3 is unable to rub on the sliding surface 2. Since the flight of the disc 3 is dependent upon the characteristics of the air cushion, it is important not to provide, in any significant sector of the annular band of the disc, irregularities in the profile of the sliding surface or air intake orifices which could give rise to local deformations capable of adversely affecting the flatness of the disc. According to the invention, the intake of air required for supporting the air cushion takes place outside the annular band, i.e. inside the circumference 14. In addition, apart from a substantial irregularity in profile, such as 6, which occupies a narrow sector of the plate 1, and which is recessed, the zone of the sliding surface 2 below the annular band of the disc 3 is substantially flat and free from any orifices extending through the disc. In the case of optical reading by transmission, a transparent window 5 aligned in the direction of exploration 17 has to be provided in the plate 1. However, this window 5 is designed in such a way as not to introduce any significant irregularity of profile into the sliding surface 2. In the case of the flexible disc mentioned by way of example above and for a rotational speed of 1500 revolutions per minute, the air cushion keeps the disc at a distance of from 150 to 180 microns from the sliding surface. In a case such as this, the reading window 5 may be formed by a radial slot 2 to 3 mm wide for a length of 120 mm. There is of course no need to provide any reading window in the plate 1 for optical reading by reflection, for mechanical reading, electrical reading or magnetic reading.

When the sliding surface of the plate 1 has a recessed profile irregularity 6 of considerable depth, the disc 3 develops a fold 7. This fold 7 must not have any repercussions on the flight level of the disc in the exploration zone 17. To this end, provision is made in accordance with the invention to ensure that the angle $\theta$, which measures the angular interval between the folded region 7 and the exploration line 17 in the direction of rotation 11, does not have to be around zero or around 360°. By way of nonlimiting example, the angle $\theta$ may be of the order of 240°, which ensures that any local folds are effectively smoothed out before reading.

Among the stresses which the disc 3 encounters during its rotation, it is necessary to take into consideration the electrostatic attraction forces. Tests have shown that the disc 3 can rub accidentally on the sliding surface 2. As a result of the friction thus generated, the disc may acquire an electrostatic charge sufficient to affect the flight level so that the disc is in danger of coming back into contact with the plate. This phenomenon may continue to occur until the disc jams and comes to a standstill.

In order to prevent this phenomenon from occurring, the flight level may be suitably increased, but only to the detriment of the accuracy of positioning.

Steps may also be taken to ensure that the electrical charges created by friction are eliminated as they occur by locally providing an increased flight level so that an increased air flow can neutralize these charges by virtue of the presence of water vapour in the air stream.

According to the invention, this neutralization of the electrostatic charges is obtained by a profile irregularity recessed into the sliding surface 2. The indentation 6 formed in the plate 1 locally increases the flight level by virtue of the turbulence generated by a sudden interruption in its profile.

Figure 3:
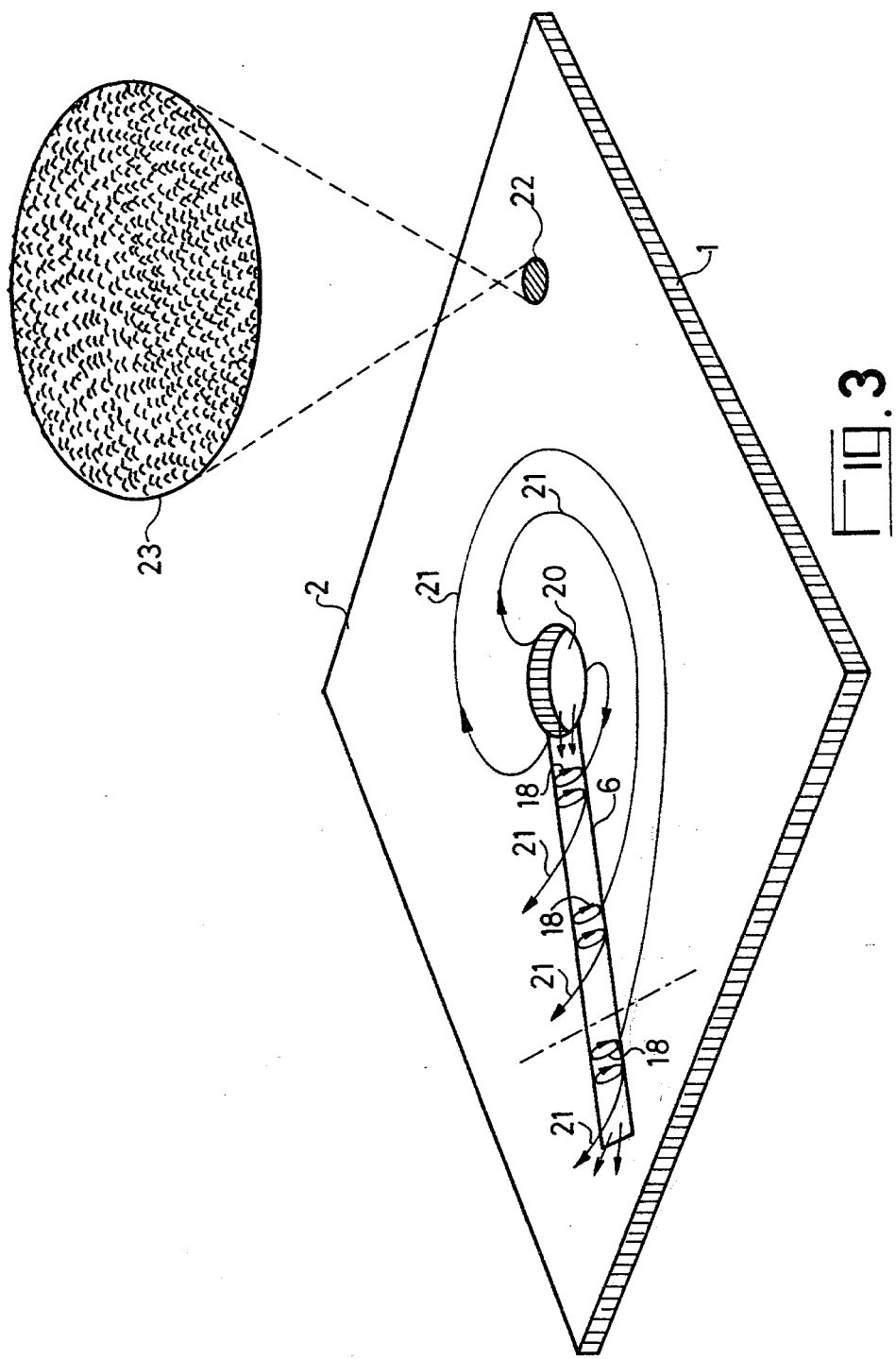
FIG. 3 is an isometric view illustrating the trajectories of the particles of air and the granular texture of the surface of the stabilizing plate.

This profile is shown in the sectional view of FIG. 5 where the same references denote the same elements as in FIG. 1. The turbulence 18 generated by the edge 19 of the step 6 cause the flexible disc 3 to develop a fold 7. FIG. 3 illustrates the spiral trajectory of the fine streams of air 21 from the air intake orifice 20 to the periphery of the sliding surface 2. The step 6 gives rise to turbulence 18 and, since it opens into the orifice 20, it also acts as a collecting channel locally increasing the air flow. The sliding surface 2 may be formed by a smooth electrically conductive surface. By way of non limiting example, the step 6 may have a triangular profile. This triangular profile may extend over a width of approximately 20 mm and may have a depth of from 0.3 to 1 mm.

If the surface of the plate is smooth, a boundary layer is formed, decelerating the flow of air because the air remains stationary in the immediate vicinity of the fixed plate. This deceleration is in danger of affecting the flight level and may cause the disc to rub on the plate. In order to obviate this disadvantage, it is of advantage to provide the sliding surface 2 of the plate 1 with a granular texture. A surface such as this having an orangeskin profile is illustrated in FIG. 3 by an area 22 of which is considerable enlargement 23 shows the profile which may be obtained for example by sand blasting or shot blasting.

FIG. 4 is a diametral section through the central zone of the disc 3 and the stabilizing plate visible in FIG. 1. The same reference denote the same elements. It can be seen that the air cushion increases in thickness towards the drive shaft 16, i.e. away from the annular band. Since the disc 3 is flexible, this widening towards the centre may be obtained by fixing the disc 3 of the rotating spindle by an element 9 holding the disc at the height H above the plate of the sliding surface 2. The widening may also be obtained by a conical indentation towards the centre of the plate. By way of non limiting example, a conical recess having an apex angle equal to 178°, its base being formed by a circle 100 mm in diameter, enables the height H to be fixed at 0.2 mm±0.5 mm. In the absence of the conical recess, H would have to be selected equal to 0.4 mm±0.1mm to facilitate the flow of air. Thus, by virtue of the conical recess, the height at which the disc is fixed to the rotating spindle 8 is far less critical.

Figure 2:
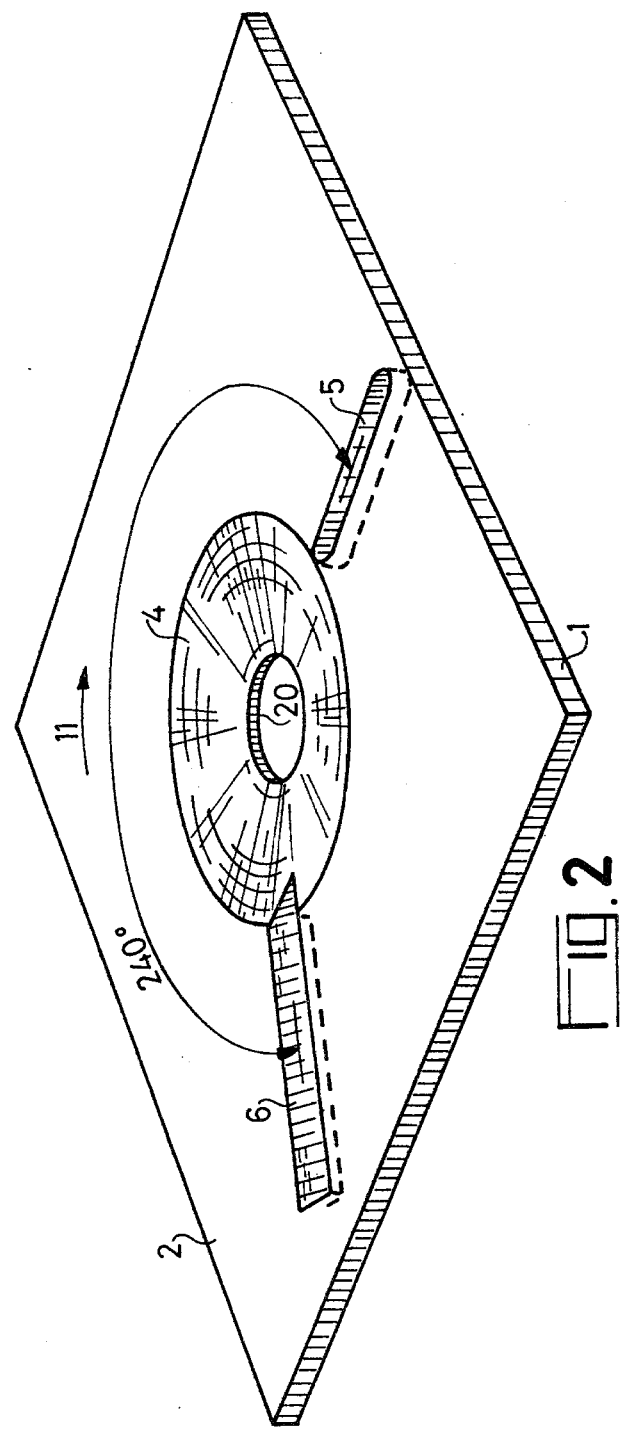
FIG. 2 is an isometric view of a stabilizing plate provided with a reading window, a step and a central recess.

FIG. 2 is an isometric view of the support plate according to the invention. Several means co-operating to improve the support of the disc have been combined with one another. Naturally the invention is not limited to the use of a single step 6. Instead it is possible to provide several steps grouped in a sector remote from the reading window 5 or from the exploration line. In order to obtain strong turbulence forces, it is of advantage to provide a step having a steep side substantially forming a right-angle with the sliding surface and to arrange this steep side in such a way that it is the first to be encountered by the fine streams of air entrained by the disc. Similarly, several orifices may be provided in place of the orifice 20, providing they are arranged in the central recess 4. The material of which the plate 1 is made may be electrically insulating and rendered conductive along the sliding surface 2 by a deposit of hard conductive material, such as a thin film of chromium.

In conclusion, it is pointed out that the invention is applicable to any flexible disc irrespective of whether the information to be read is contained on any one of its faces or protected by a protective film belonging to the disc. The flexible disc readers which use the support system illustrated in FIGS. 1 to 5 can be made in two different forms. The first of these forms consists in placing the disc above the stabilizing plate. In this case, the sliding surface is horizontal and faces upwards. In the other embodiment, the disc is placed below the stabilizing plate, the sliding surface of the stabilizing plate being horizontal and facing downwards. In this latter case, the disc in its stationary state does not rest on the sliding surface because, held by its centre, it bends under the effect of its weight. On the other hand, when it reaches a sufficiently high rotational speed, it expands under the effect of the centrifugal force, which leads back to the preceding case.

Finally, it can be seen that gravity plays an entirely secondary part in the operation of the support system according to the invention. There is nothing to prevent the sliding surface of the stabilizing plate being inclined or even vertical in the reader in the operating position.

What we claim is:

1. A support apparatus for a flexible disc that produces an air bearing when said flexible disc is rotated; said flexible disc being provided on at least one of its faces with an annular band reserved for the storage of information and with a hole intended to receive a drive spindle; said support apparatus comprising a fixed stabilizing plate having a sliding surface such that said annular band retains its flatness when it supports said disc in its stationary position and air intake means; said flexible disc being rotated near said fixed stabilizing plate for drawing air through said air intake means to form an air bearing support of said flexible disc relative to said fixed stabilizing plate; said sliding surface being locally depressed for improving the floating of said flexible disc and being free from any irregularity capable of adversely affecting the flatness of said annular band in a major sector of said disc; said information being explored along a line; said sliding surface having in the zone situated below said annular band at least one depression oriented radially and situated in a sector remote from said line.

2. A support apparatus as claimed in claim 1, wherein said air intake means is formed by a central recess in said plate situated outside that zone of said sliding surface which is situated below said annular band.

3. A support apparatus as claimed in claim 1, wherein said sliding surface is grainy.

4. A support apparatus as claimed in claim 1, wherein said sliding surface is a hard, electrically conductive surface.

5. A support apparatus as claimed in claim 2, wherein said central recess is conical in shape.

6. A support apparatus as claimed in claim 5, wherein the apex angle of said central recess is slightly smaller than 180°.

7. A support apparatus as claimed in claim 1, wherein said air bearing support comprises fine streams of air entrained by said flexible disc; said depression being a step having a side forming substantially a right angle with said sliding surface; said side being the first to be encountered by said fine streams of air.

8. A support apparatus as claimed in claim 7, wherein said step has a triangular profile; its other side having a lower slope with respect to said sliding surface.

9. A support apparatus as claimed in claim 1, wherein said air intake means is formed by a central recess; said depression communicating with said central recess.

10. A support apparatus as claimed in claim 1, wherein the angle measured in the direction of rotation of said disc between said depression and said line is in the order of 240°.

11. A support apparatus as claimed in claim 1, wherein said plate is provided with a transparent reading slot arranged along said line.

12. A support apparatus as claimed in claim 11, wherein said reading slot is a radial slot sufficiently narrow not to affect the flatness of said annular band.

13. A disc reader comprising a support apparatus for a flexible disc that produces an air bearing when said flexible disc is rotated; said flexible disc being provided on at least one of its faces with an annular band reserved for the storage of information and with a hole intended to receive a drive spindle; said suport apparatus comprising a fixed stabilizing plate having a sliding surface such that said annular band retains its flatness when it supports said disc in its stationary position and air intake means; said flexible disc being rotated near said fixed stabilizing plate for drawing air through said air intake means to form an air bearing support of said flexible disc relative to said fixed stabilizing plate; said sliding surface being locally depressed for improving the floating of said flexible disc and being free from any irregularity capable of adversely affecting the flatness of said annular band in a major sector of said disc; said information being explored along a line; said sliding surface having in the zone situated below said annular band at least one depression oriented radially and situated in a sector remote from said line.

14. A disc reader as claimed in claim 13, wherein the force of gravity tends to move the disc into contact with the sliding surface of said fixed stabilizing plate.

15. A disc reader as claimed in claim 13, wherein the force of gravity tends to move the disc away from the sliding surface of said fixed stabilizing plate.

* * * * *